Sept. 7, 1926.
F. H. AHLMAN
1,599,352
COMBINED CONTAINER AND ANCHORING MEANS THEREFOR
Filed Jan. 23, 1926  2 Sheets-Sheet 1
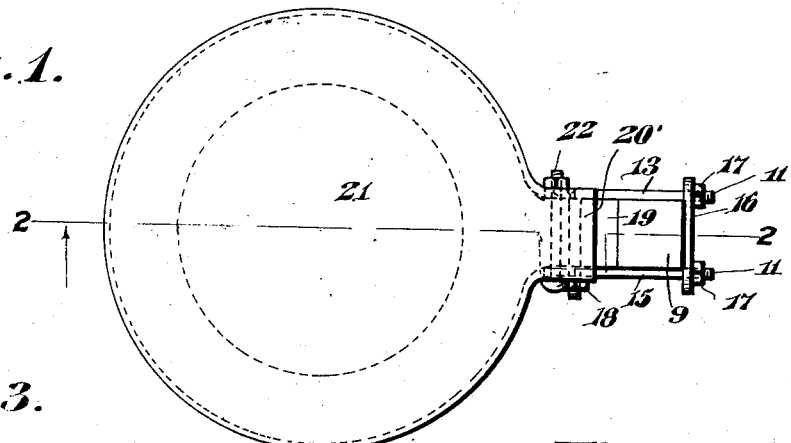
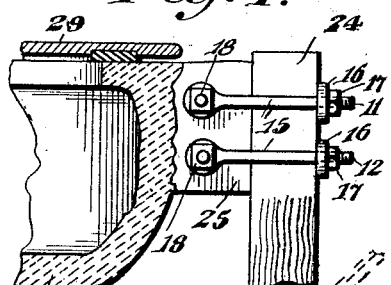
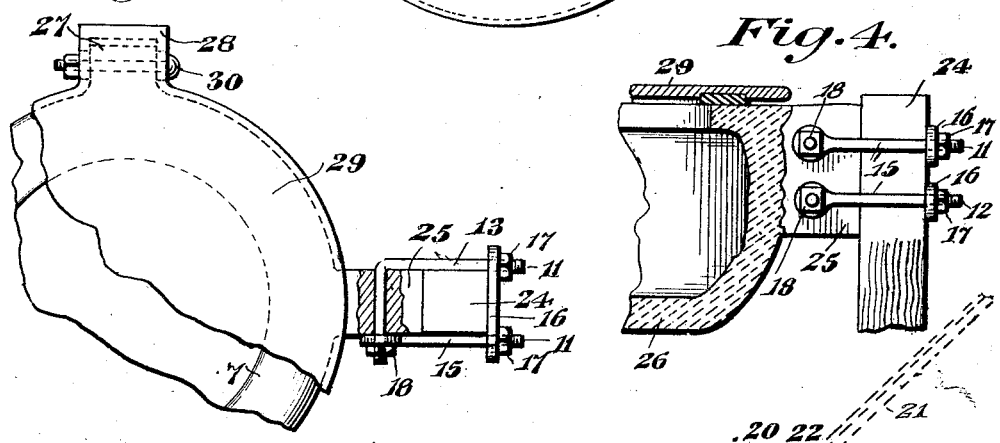
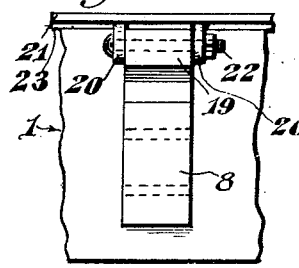
INVENTOR.
Franz H. Ahlman,
BY
Geo. P. Kimmel, ATTORNEY.

Sept. 7, 1926.
F. H. AHLMAN
1,599,352
COMBINED CONTAINER AND ANCHORING MEANS THEREFOR
Filed Jan. 23, 1926    2 Sheets-Sheet 2
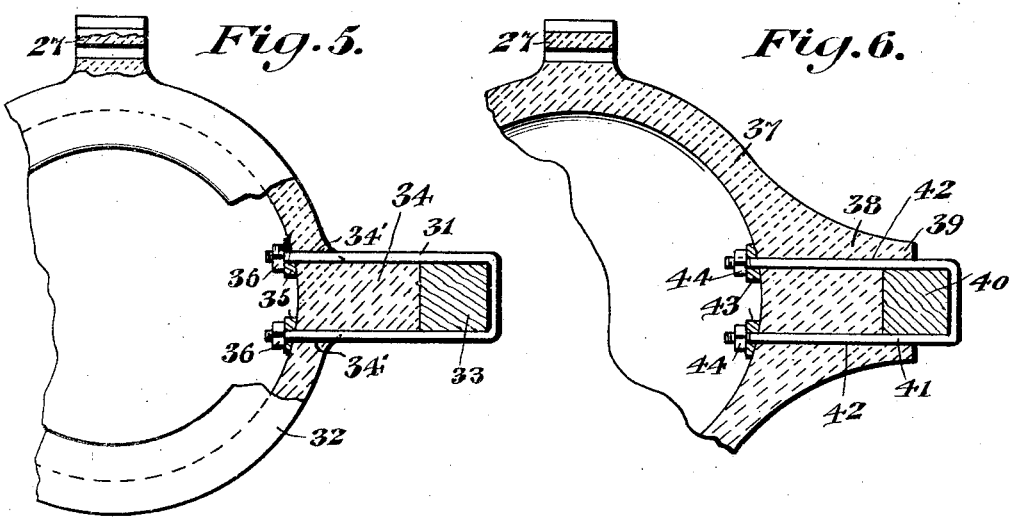
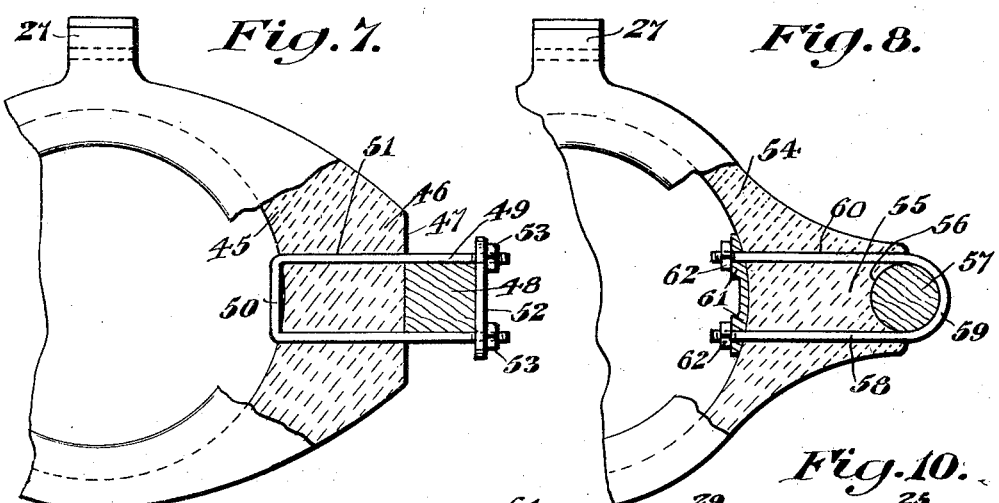
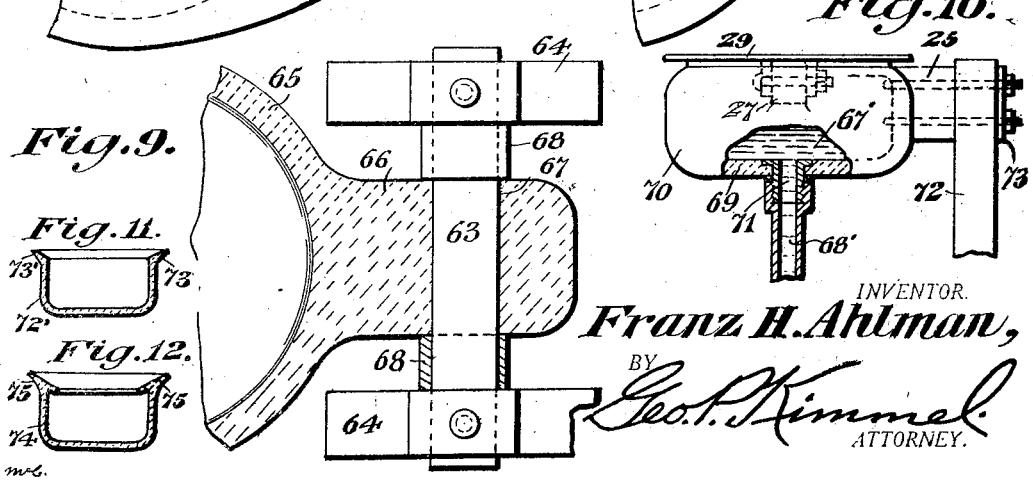
INVENTOR.
Franz H. Ahlman,
BY
Geo. P. Kimmel
ATTORNEY.

Patented Sept. 7, 1926.

1,599,352

UNITED STATES PATENT OFFICE.

FRANZ H. AHLMAN, OF MORRISTOWN, MINNESOTA.

COMBINED CONTAINER AND ANCHORING MEANS THEREFOR.

Application filed January 23, 1926. Serial No. 83,322.

This invention relates to a combined container and anchoring means therefor, and has for its object to provide, in a manner as hereinafter set forth, means for suspending a supply of salt at a point in convenient reach of an animal, but although the container is designed primarily for suspending a body of salt, yet it is to be understood that it can be employed for any purposes for which it is found applicable.

A further object of the invention is to provide, in a manner as hereinafter set forth, a combined container and anchoring means therefor, for the purpose referred to and including a lid or cover capable of being shifted to open position by the nose of the animal so that the contents of the container can be consumed by the animal.

Further objects of the invention are to provide, in a manner as hereinafter set forth, a combined container and anchoring means therefor, which is simple in its construction and arrangement, strong, durable, compact, thoroughly efficient in its use, readily assembled, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:—

Figure 1 is a top plan view of a combined container and anchoring means, in accordance with this invention.

Figure 2 is a section on line 2—2, Figure 1.

Figure 2ᵃ is a fragmentary view in rear elevation.

Figure 3 is a fragmentary view in plan, of a modified form.

Figure 4 is a fragmentary view, in section, of the form shown in Figure 3.

Figures 5, 6, 7 and 8 are fragmentary views, in sectional plan, of modified forms.

Figure 9 is a fragmentary view, in sectional plan, of still another modified form.

Figure 10 is a fragmentary view, in side elevation, and partly in section, of still another modified form.

Figures 11 and 12 are vertical sectional views of modified forms of containers.

The container in each of the forms illustrated is in the shape of a bowl and constructed of any suitable material other than metal, and preferably the container is constructed of heavy glazed stone or earthenware, and in each of the forms shown, the container is provided with a hinged cover projecting a substantial distance therefrom to enable the cover to be lifted by the nose of the animal so that access can be had to the contents of the container by the animal. The cover can be constructed of any suitable material, but of a weight to enable it to be conveniently lifted by the animal.

Referring to Figures 1, 2 and 2ᵃ of the drawings, the bowl is referred to generally by the reference character 1, and is of annular contour. The bowl comprises a body portion 2, formed of a vertically disposed intermediate portion, an inwardly inclined upper portion 3 and an inwardly inclined lower portion 4, which merges into a flat bottom 5. The portions 3, 4 extend at opposite inclinations with respect to each other and the portion 3, at its top, is provided with an inwardly extending annular flange 6, which provides a seat for a resilient cushioning element 7, which is in the form of an annulus and is secured to the flange 6 by any suitable means. Formed integral with the rear of the body portion 2, at a point below the top thereof, as well as slightly positioned above the bottom 5, is a rectangular extension 8, which abuts against a standard 9 and further seats upon a shoulder 10 formed on the forward face of the standard 9 a substantial distance below the top thereof.

The bowl 1 is anchored to the standard 9 by an anchoring means consisting of a pair of superposed angle-shaped members 11 and 12 having one of the arms 13 positioned against one side of the extension and one side of the standard, and the other arm 14 projecting through the extension transversely thereof. The arm 13 projects rearwardly from the standard 9 and the arm 14 projects from the extension 8. Mounted on the projecting end of each arm 14 and extending rearwardly therefrom is a tie bolt 15, which is positioned against the other side of the extension 8 and standard 9. The tie bolts 15 align with the arms 13 of the members 11 and 12. The arms 13 of the members 11 and 12 are coupled with the rear ends of the tie bolts 15 by coupling plates 16, and carried by the rear ends of the arms 13 and the rear ends of the tie bolts 15 are clamping nuts 17, which bind against the plates 16. Carried by the projecting ends of the arms 14 are clamping nuts 18 which bind against the heads of the tie bolts 15 and maintain these latter in abutting position with respect to the extension 8 and standard 9. The foregoing arrangement of elements anchors the bowl 1 to the standard 9 and furthermore permits of the bowl 1 to be detached from the standard when desired.

The body portion 2 of the bowl 1 has projecting from the rear thereof an apertured lug 19, which is spaced above the extension 8, and positioned at each side of the lug 19 is an apertured ear 20, which depends from an arm 20′ of the cover 21 for the bowl 1. Extending through the ears 20 and lug 19 is a pivot bolt 22, which in connection with the lug 19 and ears 20, provides a hinged connection between the cover 21 and the body portion 2 of the bowl. The lower face of the cover 21 is provided with an annular groove 23 for the reception of the resilient cushioning element 7 when the cover is in closed position.

In the form shown in Figures 3 and 4, the standard indicated at 24 to which the bowl is anchored, is not provided with a shoulder 10, and the extension 25 at the rear of the bowl 26 is not arranged below the top of the bowl but is flush therewith. The bowl 26, at its rear, is not provided with a lug 19 as referred to with respect to the bowl 1, but bowl 26, at its side at right angles to the extension 8, is formed with an apertured lug 27, to which the arm 28 of the cover 29 is hinged by the pivot bolt 30. The arm 28 is provided with depending ears in the same manner as the arm 20′ of the cover 21.

The extension 25 is anchored to the standard 24 by a similar means, as that employed with respect to the extension 8.

The form shown in Figure 5 is the same as that referred to in connection with Figures 3 and 4, with this exception that a pair of superposed yokes 31, only one of which is shown, is employed for anchoring the bowl 32 to the standard 33. The bowl 32 is formed with an extension 34, which abuts against the standard 33. The arms of each yoke extend through the body portion of the bowl and openings 34′ are provided for such purpose. The inner ends of the arms of each yoke carry a washer 35, which abuts against the inner face of the bowl 32, and binding against the washers 35 are clamping nuts 36 carried on the inner ends of the arms of each yoke.

In the form shown in Figure 6, the cover is hinged thereto in the same manner as that shown in Figure 3. In Figure 6 the bowl is indicated at 37 and at its rear is formed with a tapered extension 38, having its free end provided with a seat 39 into which extends the standard 40. The bowl 37 is anchored to the standard 40, by a pair of superposed yokes 41, only one of which is shown, and the arms of the yokes pass through the extension 30 and into the bowl 37. Openings 42 are provided for the passage of the arms of each yoke. The inner ends of the arms of each yoke carry washers 43, which abut against the inner face of the bowl, and clamping nuts 44 on the inner ends of the arms of the yokes bind against the washers 43.

In the form shown in Figure 7, the cover is connected therewith in the same manner as that referred to in connection with Figure 3. In Figure 7, the bowl is indicated at 45 and is formed with a lateral offset 46 at its rear having a plane free end, as indicated at 47, and against which abuts the standard 48. The bowl 45 is anchored to the standard 48 by a pair of superposed yokes 49, only one of which is shown, and the yokes 49 are so set up that the arms thereof will project rearwardly from the standard 48. The head 50 of each yoke is positioned against the inner face of the bowl 45, and the arms of each yoke extend through the enlargement and project rearwardly therefrom. Openings 51 are provided for the passage of the arms of the yokes. The arms of each yoke 49 are connected together by a coupling plate 52, which abuts against the rear face of the standard 48, and binding against each plate 42 are clamping nuts 53, which are carried on the rear ends of the arms of each yoke.

In the form shown in Figure 8, the cover is connected therewith in the same manner as that referred to in connection with Figure 3. In Figure 8, the bowl is indicated at 54 and has its rear formed with a rearwardly extending tapered extension 55, provided at its rear end with a curved seat 56, in which is positioned a cylindrical standard 57. The bowl 54 is anchored to the standard 57 by a pair of superposed yokes 58, only one of which is shown. The head 59 of a yoke is of arcuate form so as to snugly embrace the standard 57. The arms of each yoke project through the extension 55 and into the bowl 54, and openings 60 are provided for the passage of the arms of each yoke. The inner ends of the arms of each yoke are connected together by a coupling piece 61, having one face conforming to the curvature of the inner face of the bowl so that the coupling piece 61 will snugly fit against the inner face of the bowl 54. Mounted on the inner ends of the arms of each yoke are clamping nuts 62, which bind against the coupling piece 61.

In the form shown in Figure 9, the bowl is set up to be suspended by a cross bar 63, secured to a pair of opposed, spaced standards 64. The bowl, which is indicated at 65, has a rearward extension 66 formed with a transversely extending polygonal-shaped opening 67, which corresponds in contour to the shape of the cross bar 63. Mounted on the cross bar 63 and interposed between the extension 66 and standards 64 are spacing collars 68. Otherwise than that as stated, the bowl 65 is constructed in the same manner as that referred to with reference to Figures 3 and 4.

The form as shown in Figure 10 is employed to contain a body of water 67, supplied thereto by a feed pipe 68. The pipe may enter the bowl at any desired point. The construction of the bowl shown in Figure 10 is the same as that referred to with respect to Figures 3 and 4, with this exception that the bottom 69 of the bowl 70 has mounted therein an inlet nipple 71. The nipple depends from the bottom 69 and has the pipe 68 connected therewith. An anchoring means between the bowl 70 and the standard 72 is indicated at 73.

In the form shown in Figure 11, the bowl 72' is shown provided with an upstanding inclined bevelled flange 73' at its top which projects outwardly from the latter, and in the form shown in Figure 12 the top of the bowl 74 is formed with an inwardly and outwardly extending flange 75. The upper faces of the flanges 73' and 75 act to deflect salt or water back into the bowl, otherwise than that as stated the construction is the same as referred to in connection with the other forms.

As is well known, salt quickly attacks metal and for that reason the bowl is constructed of heavy glazed stone or earthenware. The bowl provides means whereby a supply of salt can be conveniently supported for farm animals at all times without chances of the salt becoming unfit for use through contaminating metal, and the device includes simple and inexpensive means for anchoring the bowl at the desired elevation to a support therefor. Then furthermore as a cover is employed, when the contents of the bowl are not desired for use the cover when closed protects the contents of the bowl from inclement weather. As the cover is provided with laterally extending arm, its upward movement is arrested by the outer face of the bowl and this is clearly shown in Figure 2. Although preferably the bowl is annular in contour, yet it is to be understood that it can be of any desired shape. If desired a packing can be interposed between the standard or support and the extension on the bowl.

It is thought that the many advantages of a container and anchoring means therefor, in accordance with this invention, can be readily understood, and although the preferred embodiments of the invention are as illustrated and described, yet it is to be understood that changes in the details of construction can be had which will fall within the scope of the invention as claimed.

What I claim is:—

In combination, an open top receptacle having an inwardly extending right angularly disposed flange flush with the top edge thereof, said flange coextensive with said edge, said receptacle further having as integral part thereof a lateral extension and an apertured laterally disposed lug, said extension and lug projecting from the outer side face of said receptacle, a flat cover hinged to said lug, seating on said flange and edge and having its edge projecting beyond the outer side face of said receptacle, and means coacting with said extension for fixedly securing the receptacle in suspended position.

In testimony whereof, I affix my signature hereto.

FRANZ H. AHLMAN.